UNITED STATES PATENT OFFICE.

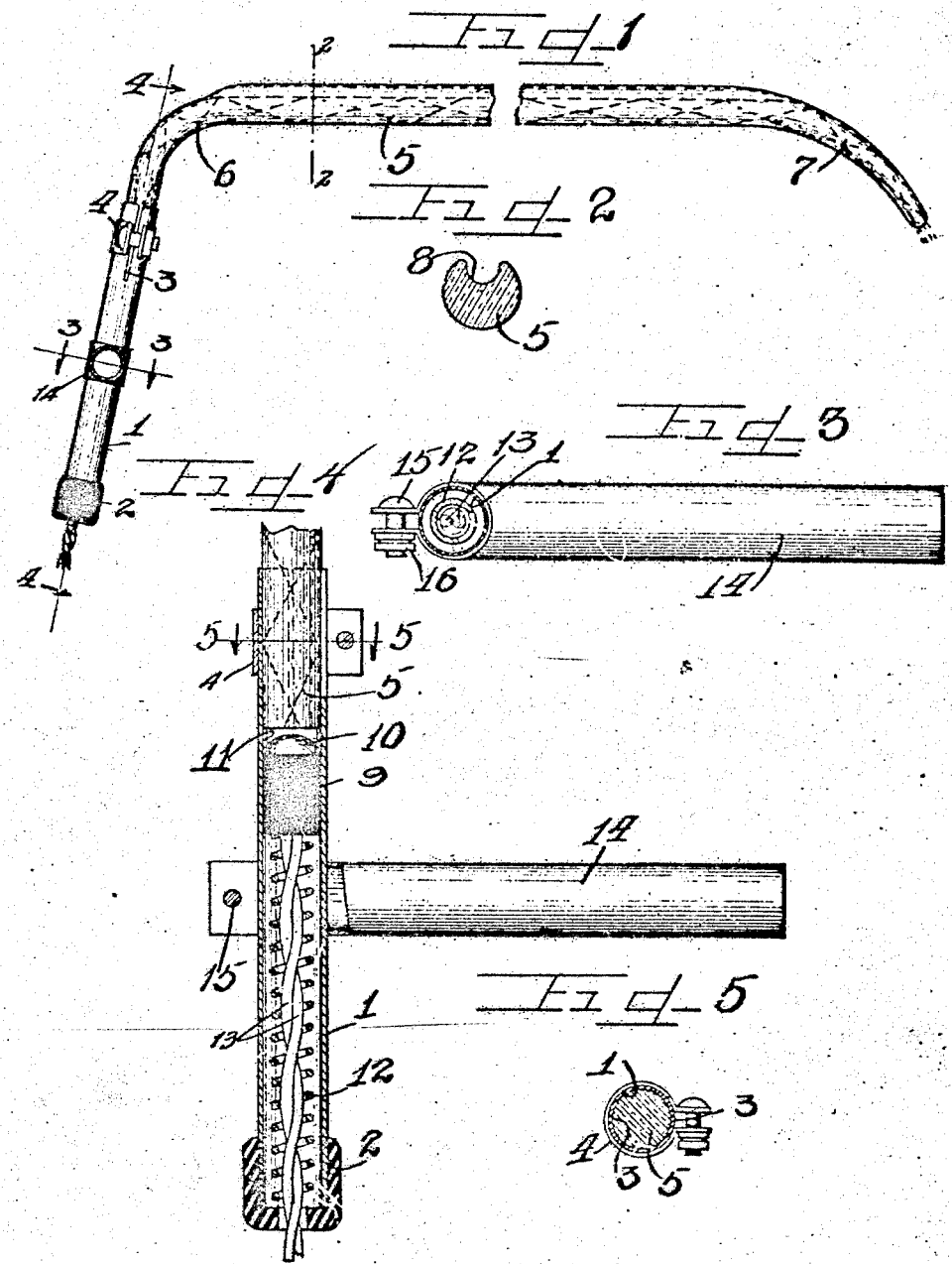

ISAAC J. SMIT, OF CHICAGO, ILLINOIS.

LIGHT-TRANSMITTING SURGICAL DEVICE.

1,326,300.      Specification of Letters Patent.      Patented Dec. 30, 1919.

Application filed August 21, 1916. Serial No. 116,177.

*To all whom it may concern:*

Be it known that I, ISAAC J. SMIT, a citizen of the United States, and a resident of the city of Chicago, in the county of Cook and State of Illinois, have invented certain new and useful Improvements in Light-Transmitting Surgical Devices; and I do hereby declare that the following is a full, clear, and exact description of the same, reference being had to the accompanying drawings, and to the numerals of reference marked thereon, which form a part of this specification.

This invention relates to a surgical device which is self-illuminating as well as transparent to permit observation therethrough. The device as heretofore generally constructed is made of metal, and is termed a "sound," and the same is made in a number of different sizes and shapes, according to the particular use of the instrument.

This invention, however, contemplates the construction of a "sound" of a transparent material such as glass, and so constructed and associated with an illuminating means that the light is transmitted therethrough and projected from a light emitting surface, so that in the use of the device, exploration of the passage of movement of the device by the user is augmented greatly owing to the fact that the "sound" is provided with a longitudinal groove along which observation may be made. Rays of light passing through the transparent "sound" are invisible except at the point of emission thereof from the sound so that a clear vision may be had directly along the sound of objects in its passage desired to be examined.

It is an object therefore of this invention to construct a transparent surgical device constructed to transmit light therethrough to project the same from an emission surface by internal reflection of the light on its passage through the device thus permitting a clear vision of objects to be had directly through the device as it is used.

It is also an object of this invention to construct a light transmitting surgical device wherein the source of light is removed from the point of projection of the light rays from the device, and yet a device wherein clear vision may be had directly therealong for examination of objects with the passage of the device into the organs to be examined without the projection of the light from the device except at the emission or projecting surface provided for the purpose.

It is also an object of this invention to construct a "sound" for surgical use of transparent material designed to transfer light therethrough by internal reflection to emit the light from a certain predetermined point thereof.

It is furthermore an object of this invention to construct a light transmitting surgical device designed to permit the use of other surgical apparatus therewith after insertion of the device into the organs of the human body and serving by total internal reflection to transmit light from the proper source through to the end of the device without emitting light through the side walls of the transparent conducting element, so that a clear and unobstructed vision may be had along said element and illumination of objects also obtained at the extreme end thereof adjacent the light emitting surface.

It is finally an object of this invention to construct a light transmitting surgical device of transparent material through which the light is caused to traverse in a tortuous path but confined therein throughout its length by total internal reflection and emitted only at the end thereof from a light emitting or projecting surface provided for the purpose.

The invention (in a preferred form) is illustrated in the drawings and hereinafter more fully described.

In the drawings:

Figure 1 is a fragmentary side elevation of a device embodying the principles of my invention.

Fig. 2 is a section taken on line 2—2 of Fig. 1.

Fig. 3 is a section taken on line 3—3 of Fig. 1.

Fig. 4 is a detail section with the parts in elevation, taken on line 4—4 of Fig. 1.

Fig. 5 is a detail section taken on line 5—5 of Fig. 4.

As shown in the drawings:

The reference numeral 1, indicates a cylindrical casing having threaded on its lower end an insulating closure 2, and provided in its upper end with slots 3, and with a clamp 4, surrounding the cylindrical slotted portion of the casing. The purpose of the clamp 4, is to hold releasably attached into the upper slotted end of the casing 1, the cylindrical ends of a relatively long transparent glass member termed a "sound", denoted by the reference numeral 5. Said member is curved near each of its ends, as denoted by the reference numerals 6 and 7, respectively, and along its straight middle portion is enlarged in diameter, and provided with a longitudinal groove 8, in the outer periphery thereof, as shown in section in Fig. 2. The curved end portion 7, is tapered, as clearly shown in Fig. 1, while the other end of said transparent glass member, which fits into the slotted ends of the casing 3, is substantially straight and is provided with a flat end surface as clearly shown in Fig. 4.

Releasably engaged within the cylindrical casing 1, is an insulating plug 9, within which is mounted an electric bulb 10, and movement toward the upper end within said casing 1, of the insulating plug 9, is limited by a stop 11, secured within said casing, as shown in Fig. 4, which also affords a stop for the end of the transparent light conducting element 5. Said insulating plug 9, and its electric bulb 10, are normally held against said ring 11, by a coiled spring 12, which is seated upon the closure cap 2, at the lower end of the casing 1, and lead wires 13, are connected through said plug 9 to the bulb 10, and lead outwardly from the casing to a suitable source of electric current supply. A handle 14, is held clamped around the cylindrical casing 1, by means of a threaded screw 15, and nut 16, as clearly shown in Figs. 3 and 4.

The operation is as follows:

In using the instrument the electric current is switched on so that the electric bulb 10, is illuminated, and as a consequence the rays of light therefrom enter into and through the flat end surface of the long transparent sound member and are reflected therethrough by total internal reflection, and thus transmitted for projection at the outer tapered end of the sound member. None of the light passing through the transparent sound member 5, is emitted through the side walls thereof, owing to the fact that the angle of incidence of the rays striking the highly polished exterior surfaces or "surfaces of separation" between said transparent element and the air is greater than the critical angle between glass and air and as a consequence total internal reflection thereof for passage of the rays around the curved portions 6 and 7, and through the straight portion 5, of the sound member takes place, the rays being finally emitted at the reduced tapered end of the transparent conducting element. Owing to the fact that the sound member 5, is provided with a longitudinal groove, an unobstructed vision is had therealong so that the passage of the instrument into the organs of the human body may be readily observed. The groove 8, formed in the upper surface thereof permits other surgical devices to be used in connection with the sound member. Of course, although the transparent sound member is shown as reduced and rounded, any suitable surface whatsoever may be provided at this point to refract the projection of rays transmitted, as desired.

I am aware that the details of construction may be varied through a wide range without departing from the principles of this invention, and I therefore do not purpose limiting the patent granted otherwise than necessitated by the prior art.

I claim as my invention:

1. A device of the class described, comprising a cylindrical casing, a stop ring therein, an insulating plug adapted to be inserted into said casing and limited in its movement therein by said ring, an electric lamp carried by said plug, and a transparent light conducting element insertible into the other end of said casing and also limited in its movement therein by said ring.

2. A device of the class described, comprising a cylindrical casing, a stop ring therein, an insulating plug adapted to be inserted into said casing and limited in its movement therein by said ring, an electric lamp carried by said plug, a closure for said end of the casing, a coiled spring in said casing disposed between said closure and said plug to retain the latter in position, and a transparent light conducting element insertible into the other end of said casing and also limited in its movement therein by said ring.

In testimony whereof I have hereunto subscribed my name in the presence of two subscribing witnesses.

ISAAC J. SMIT.

Witnesses:
CHARLES W. HILLS, Jr.,
EARL M. HARDINE.